Oct. 30, 1945. D. TOPJIAN 2,387,957
METHOD OF INHIBITING ODORS
Filed Aug. 11, 1944
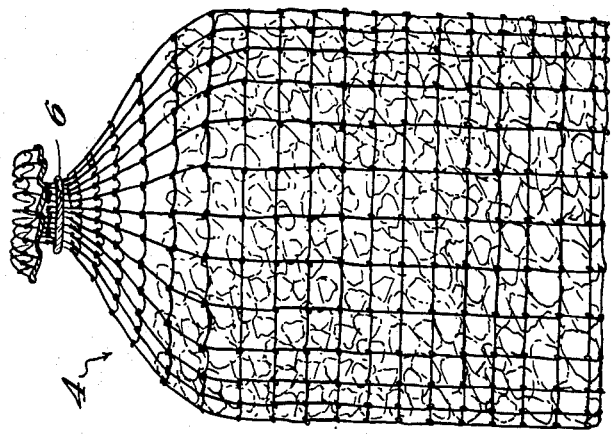
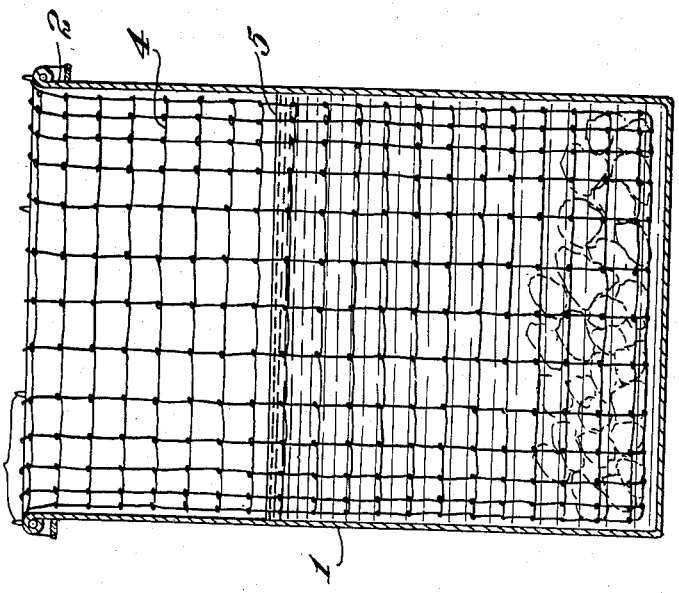
Inventor
Daniel Topjian
by Roberts Cushman Corcoran
Att'ys.

Patented Oct. 30, 1945

2,387,957

UNITED STATES PATENT OFFICE 2,387,957

METHOD OF INHIBITING ODORS

Daniel Topjian, Watertown, Mass.

Application August 11, 1944, Serial No. 549,094

5 Claims. (Cl. 21—55)

This invention pertains to a method of inhibiting the evolution of disagreeable odors from fish, meats and other organic offal. Dealers in fish and fish products are always faced with the difficult problem of preventing or eliminating the odors emitted by fish (even when perfectly fresh), and especially the very powerful and disagreeable odor which arises from fish offal, particularly in warm weather, when it is subject to very rapid bacterial attack. Even the most extreme cleanliness fails wholly to eradicate such odors. In consequence, many fastidious persons develop a dislike for fish or at least hesitate to enter a fish dealing establishment because of their repugnance to the odor usually associated with such a place, and in consequence the use of fish, which is in reality a very valuable, nutritious and usually relatively cheap food product, is undeniably less general than it would otherwise be.

Dealers in meat experience the same difficulty, though to a much lesser degree, although the odor of meat bones, tallow, etc., as received at the rendering establishment is about as offensive as that of decayed fish. Both fish and meat offal are highly attractive to flies and thus a menace to health.

The principal object of the present invention is to provide a novel method of handling fish, meat, or other organic offal such that the evolution of odor is substantially eliminated; to provide a method of handling the offal such that it is very easily disposed of; to provide a method of handling the offal such that even after removal of the offal from the dispensing establishment it remains for a substantial period without developing a disagreeable odor; to provide a method of treating the offal for the elimination of odor such that its value as an animal feed, soap or fertilizer base is not substantially impaired; and to provide a method of treating the offal such that vagrant odors resultant from the inevitable dropping of fish liquids or small portions of fish upon the floor will be overpowered and concealed by a mild and pleasing fragrance. Other and further objects and advantages of the invention will be pointed out in the following more detailed description and by reference to the accompanying drawing, wherein:

Fig. 1 is a vertical diagrammatic section illustrating apparatus useful in the performance of the improved method; and Fig. 2 is a side elevation of a container useful in disposing of the offal.

In accordance with the present invention, the fish or other offal, substantially as fast as it is produced, is immersed in a body of fluid which has the effect of inhibiting bacterial action and at the same time preventing the evolution and dispersion into the air of the disagreeable odors natural to fish offal as well as those resultant from bacterial action. This body of fluid is an aqueous solution of common salt (sodium chloride), the salt constituting from 25 to 30% of the whole (that is to say, being from 2 to 3 pounds per gallon of water). In preparing this solution the water is preferably first heated to boiling and the salt is then dissolved in the hot water. To this salt solution glycerine is added to constitute from 25 to 30% of the whole. In accordance with a more specific embodiment of the invention, an odiferous substance, for example oil of orange, is added to the extent of two drams per gallon of solution.

To facilitate the practice of the method, it is proposed to provide a fluid-tight, open-topped tank or receptacle for the fluid, of a size and dimensions such that it may be installed in the near vicinity of the place at which the fish offal is produced. Preferably, although not necessarily, this tank or receptacle should be of a size such as to be capable of receiving the offal produced through a substantial period of time, for example a day.

Such a receptacle is indicated at 1 in Fig. 1, and to facilitate the practice of the process as about to be described, the rim 2 of this receptacle is here shown as provided with a plurality of upstanding pegs 3, although any other suitable type of retainer or fastener may be substituted. To conserve the fluid and to facilitate the disposal of the offal, it is preferred to provide a container 4, here shown as a flexible bag of open mesh material which is not disintegrated by the action of water. A bag of the type commonly known as an "onion" bag is suitable for this purpose. Preferably, this bag or container should be of cheap material such that it may be discarded when the offal is disposed of.

In use, the body 5 of fluid is placed in the receptacle 1 so as partially to fill the receptacle, and the bag 4 with its top open is suspended in the receptacle with its upper portion engaging the pins 3 so as to hold it open and to prevent it from dropping into the receptacle. The fish offal, as produced, is now thrown into the bag or container 4 and drops down into the liquid in the receptacle so as to be immersed in the latter. As the mass of offal increases, the level of the liquid gradually rises in the receptacle, the amount of liquid first introduced being so regulated that its level will not rise above the top of the receptacle when the container has received a maximum amount of offal. When the container is substantially full, it is lifted from the receptacle and preferably held above the receptacle until surplus liquid has drained out from the offal. Instead of suspending the container above the receptacle during this draining, it may be suspended above some other suitable receptacle and the drainage may be returned to the receptacle 1 when convenient. After the liquid has thus drained from the offal in the container, the top of the latter is preferably gathered together and secured, for example, by means of a binding string 6 (Fig. 2). The container with the offal may now be stored until it is convenient to convey it to a place of disposal. Even if thus stored for a substantial time, the treatment with the liquid as above described is such as to inhibit bacterial action and the evolution of disagreeable odors.

If desired, the fluid employed in thus treating the offal may have added to it some suitable odiferous substance, for example oil of orange or the like, the quantity of such odiferous material being relatively small, for instance 1 or 2 drams per gallon of solution, and as such odiferous substances are obtainable at a low cost, it may be desirable to employ them under some circumstances, since there is always the possibility that small portions of offal or of liquids from the fish may be accidentally dropped or spilled and not placed in the container, so that though the main source of bad odor is eliminated, some slight odor may remain, this being disguised by the odiferous substance placed in the fluid body and which gradually volatilizes and imparts a pleasing odor to the surrounding atmosphere.

While the flexible container herein described, which is itself disposed of after one use, is desirable, it is contemplated that other arrangements may be employed. For example, instead of a disposable container, a wire or similar basket may be employed, such wire basket being suspended in the receptacle 1 and receiving the offal and when filled being raised, drained and emptied into any suitable container and then returned to the receptacle for further use.

Alternatively, if the cost of the treating reagent is not regarded as prohibitive of such a procedure, the offal may be thrown into a vat or other receiver having a strainer and drain, and at the end of the day, the liquid may be drained off, for instance directly into the sewer, and the solids removed for disposal. Obviously, a container like the container 4 might be suspended in such a drainable vat, if desired.

Since the treatment with the solution as above described prevents the evolution of odor and inhibits bacterial action for a very substantial period thereafter, it is possible, in accordance with this procedure, to subject the offal, after treatment, to a drying operation, for example by blowing air through or over it, thereby greatly reducing its weight and facilitating its transportation to distant places of disposal or use, with the assurance that during such drying and transportation it will not be offensively odorous.

The treated offal, even in moist condition, is apparently unattractive to flies, and even when exposed until completely dry emits no odor to which flies are attracted.

While certain desirable embodiments of the invention have herein been described by way of example, it is to be understood that the invention is broadly inclusive of any and all equivalents such as fall within the scope of the appended claims.

I claim:

1. Method of inhibiting the emission of odor by organic offal, which comprises as steps providing a fluid body comprising an aqueous solution of glycerine and sodium chloride each in from 25 to 30% concentration, immersing the offal substantially as it is produced in said body of fluid, and at intervals removing the collected offal from the fluid body and disposing of it.

2. Method of inhibiting the emission of odor by fish offal or the like, which comprises as steps providing a fluid body comprising an aqueous solution of glycerine and sodium chloride each in from 25 to 30% concentration, providing a porous container, suspending the container within the fluid body, placing the offal, substantially as produced, in the container, and immersing the offal in the fluid, thereafter removing the container with its contents from the body of fluid and permitting fluid to drain from the container, and thereafter carrying the contents of the container to a point of disposal.

3. Method of inhibiting the emission of odor by fish offal or the like, which comprises as steps providing a fluid body comprising an aqueous solution of glycerine and sodium chloride each in from 25 to 30% concentration, providing a bag of open mesh fabric which is not disintegrated by water, suspending the bag with its mouth open in the fluid body, placing the offal, substantially as produced, in the bag so that the offal is immersed in the fluid body, thereafter removing the bag with its contents from the fluid body, draining the liquid from the bag and returning the drained liquid to the fluid body, and conveying the bag and its contents to a point of disposal.

4. Method of inhibiting the emission of odor by fish offal or the like, which comprises as steps providing a fluid body comprising an aqueous solution of glycerine and sodium chloride each in from 25 to 30% concentration, immersing the offal substantially as it is produced in said body of fluid, at intervals removing the collected offal from the fluid body, draining free fluid from the offal, drying the offal, and disposing of the dried offal.

5. Method of inhibiting the emission of odor by fish offal or the like, which comprises as steps providing a fluid body comprising an aqueous solution of glycerine and sodium chloride each in from 25 to 30% concentration, said fluid body also comprising an odiferous substance in an amount approximating one and one-half drams per gallon, immersing the offal substantially as it is produced in said body of fluid, at intervals removing the collected offal from the fluid body, draining free fluid from the offal, and conveying the offal to a point of disposal.

DANIEL TOPJIAN.